US007121879B1

(12) United States Patent
Chou et al.

(10) Patent No.: US 7,121,879 B1
(45) Date of Patent: Oct. 17, 2006

(54) ANTI-ESCAPE SOCKET AND PLUG ARRANGEMENT

(75) Inventors: Miao-Tzu Chou, Taipei (TW); Kuang-Yu Tseng, Taipei (TW); Chia-Yen Hsu, Taipei (TW)

(73) Assignee: Datavan International Corp., Taipei Hsien (TW)

( * ) Notice: Subject to any disclaimer, the term of this patent is extended or adjusted under 35 U.S.C. 154(b) by 0 days.

(21) Appl. No.: 11/306,498

(22) Filed: Dec. 30, 2005

(51) Int. Cl.
*H01R 13/73* (2006.01)
*H02B 1/01* (2006.01)

(52) U.S. Cl. ....................................... 439/564; 439/357

(58) Field of Classification Search ................ 439/540, 439/544, 562, 564, 565, 573, 575, 35
See application file for complete search history.

(56) References Cited

U.S. PATENT DOCUMENTS 5,066,246 A * 11/1991 Jensik ........................ 439/562
5,975,929 A * 11/1999 Matsuura et al. ........... 439/157
6,494,735 B1 * 12/2002 Chen et al. ................. 439/378
2006/0094293 A1 * 5/2006 Daggett et al. ............. 439/544

* cited by examiner

*Primary Examiner*—James R. Harvey

(57) ABSTRACT

An anti-escape socket and plug arrangement used in a POS (Point of Sales) system is disclosed to include an anti-escape socket, which has a face panel, an insertion hole and multiple screw holes in the face panel, a base panel, a socket body at the base panel corresponding to the insertion hole, and a retaining block at the socket body, and an anti-escape plug, which has a plug body positioned in the insertion hole of the face panel and connected to the socket body, a hook, which is provided at the plug body and hooked on the retaining block to lock the anti-escape plug to the anti-escape socket, and tie screws respectively threaded into the screw holes to enhance the connection between the anti-escape plug and the anti-escape socket.

4 Claims, 6 Drawing Sheets

ANTI-ESCAPE SOCKET AND PLUG ARRANGEMENT

BACKGROUND OF THE INVENTION

1. Field of the Invention

The present invention relates to a socket and plug arrangement for use in a POS (Point of Sales) system and more particularly, to an anti-escape socket and plug arrangement, which prevents disconnection of the plug from the socket.

2. Description of the Related Art

During the use of an informative or electronic control system, accidental disconnection of power supply or signal transmission may cause loss of data or result in a catastrophe. When data is loss, the file must be built up again. According to conventional informative and electronic control system designs, the power or signal transmission plug may accidentally be disconnected from the associating power or signal transmission socket by an external object or during delivery.

FIG. 6 shows a power plug system according to the prior art. According to this design, the power plug system comprises a metal casing A1, a first cover plate A2, which is affixed to one end of the metal casing A1 and has a center mounting hole A21 and two locating holes A22 at two sides of the center mounting hole A21, a second cover plate A3 affixed to the other end of the metal casing A1, a printed circuit board A6 mounted inside the metal casing A1, a power input member A4, which is mounted in the center mounting hole A21 at the first cover plate A1 and electrically coupled to the printed circuit board A6 and has two mounting through holes A41 at two sides, a power output member A5, which is electrically connected to the printed circuit board A6 and extending out of the second cover plate A3, two mounting screws A8 respectively mounted in the mounting through holes A41 at the power input member A4 and threaded into the locating holes A22 at the first cover plate A2 to affix the power input member A4 to the first cover plate A2, and a power cable A7, which is connected to city power supply and has a connector A71 detachably connected to the power input member A4. According to this design, the connector A71 may be disconnected from the power input member A4 easily when the power cable A7 is stretched accidentally.

SUMMARY OF THE INVENTION

The present invention has been accomplished under the circumstances in view. It is one object of the present invention to provide an anti-escape socket and plug arrangement, which eliminates the drawbacks of the aforesaid prior art design.

According to one aspect of the present invention, the anti-escape socket and plug arrangement comprises an anti-escape socket and an anti-escape plug connectable to the anti-escape socket. The anti-escape socket has a face panel, an insertion hole in the face panel, a base panel, a socket body at the base panel, and a retaining block at the socket body. The anti-escape plug has a plug body, which is positioned in the insertion hole of the face panel of the anti-escape socket and connected to the socket body at the base panel of the anti-escape socket, and a hook, which is provided at the plug body and hooked on the retaining block at the socket body to lock the anti-escape plug to the anti-escape socket. According to another aspect of the present invention, fastening members, for example, tie screws are provided at the anti-escape plug for threading into respective screw holes to enhance the connection between the anti-escape plug and the anti-escape socket.

DETAILED DESCRIPTION OF THE INVENTION

Figure 1:
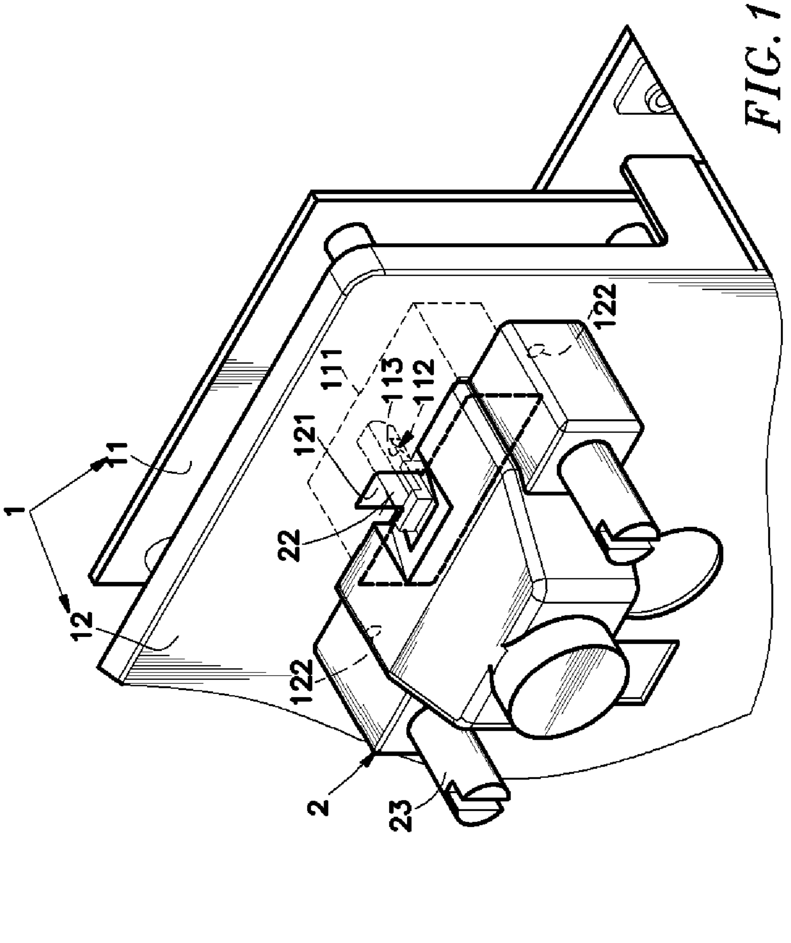
FIG. 1 is a perspective view of an anti-escape socket and plug arrangement according to the present invention.
Figure 2:
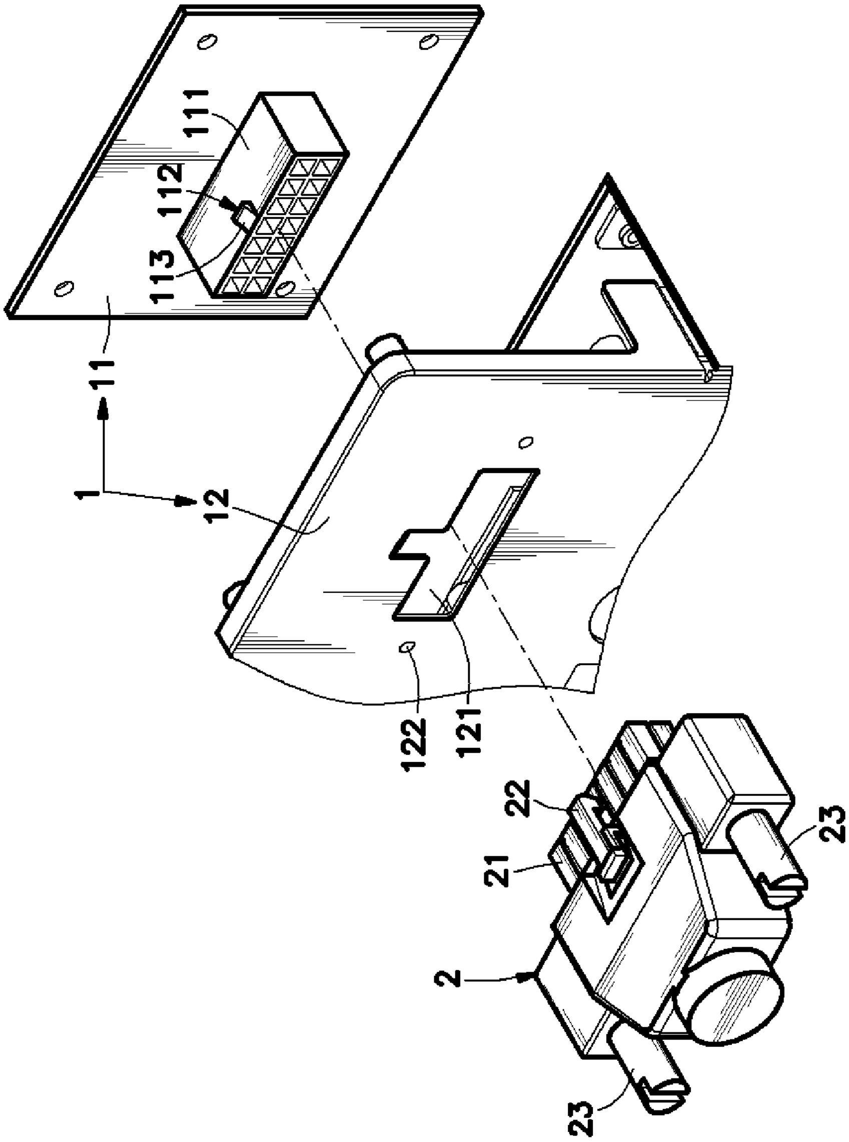
FIG. 2 is an exploded view of the anti-escape socket and plug arrangement according to the present invention.

Referring to FIGS. 1 and 2, the present invention comprises an anti-escape socket 1, and an anti-escape plug 2.

The anti-escape socket 1 comprises a base panel 11 and a face panel 12. The base panel 11 comprises a socket body 111 for receiving the anti-escape plug 2, and a retaining block 112 fixedly provided at the top side of the socket body 111. The retaining block 112 has a sloping guide face 113. The face panel 12 has an insertion hole 121 for the insertion of the anti-escape plug 2, and two locating holes 122 equally spaced from the insertion hole 121 at two opposite lateral sides.

The anti-escape plug 2 comprises a plug body 21 for insertion through the insertion hole 121 of the face panel 12 into the socket body 111 of the base panel 11, a hook 22 suspending at the top side of the plug body 21 for hooking on the retaining block 112 of the socket body 111 to lock the anti-escape plug 2 to the socket body 111 of the anti-escape socket 1, and two fastening members 23 for fastening to the locating holes 122. According to this embodiment, the locating holes 122 are screw holes, and the fastening members 23 are tie screws.

Figure 3:
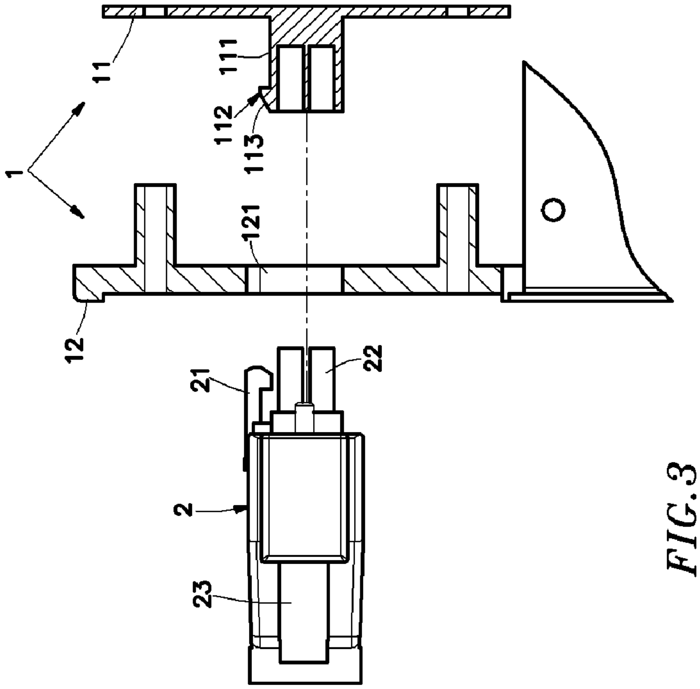
FIG. 3 is a sectional side view of FIG. 2.
Figure 4:
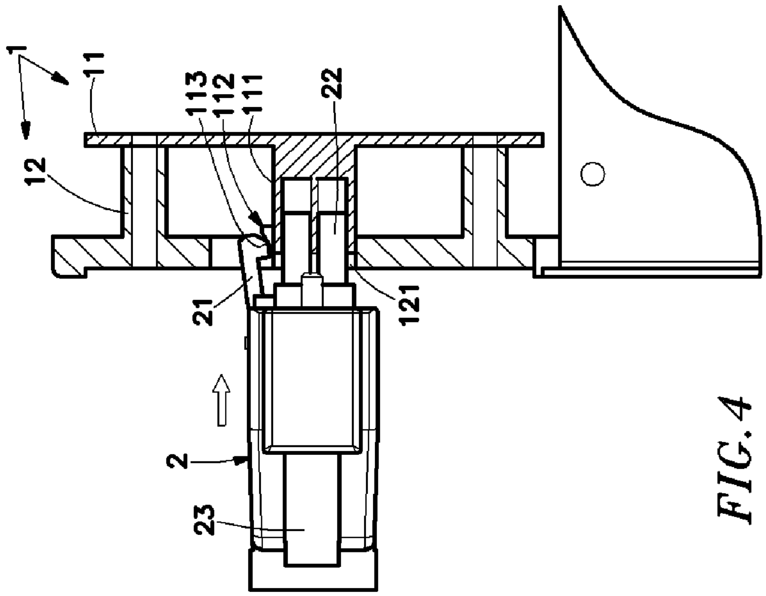
FIG. 4 is corresponding to FIG. 3, showing the plug body of the anti-escape plug inserted through the insertion hole of the face panel into the socket body at the base panel of the anti-escape socket.
Figure 5:
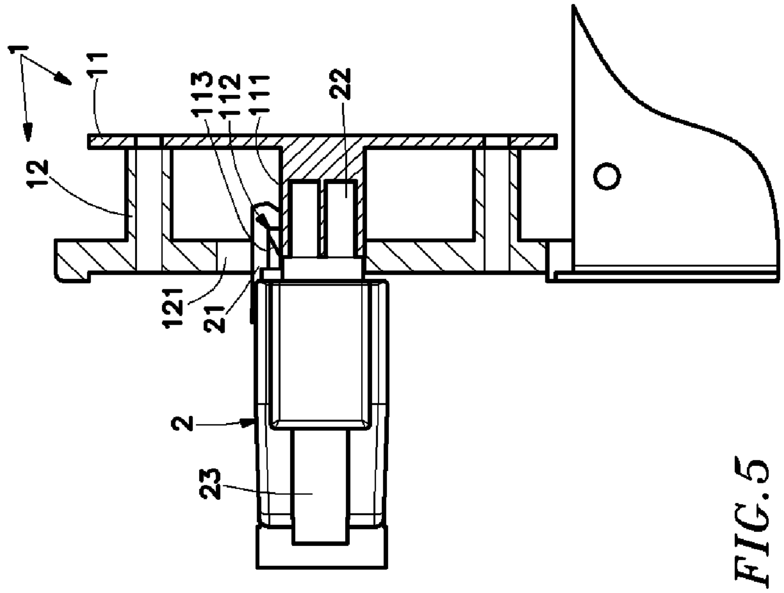
FIG. 5 is corresponding to FIG. 4, showing the hook of the anti-escape plug hooked on the retaining block at the socket body of the anti-escape socket.
Figure 6:
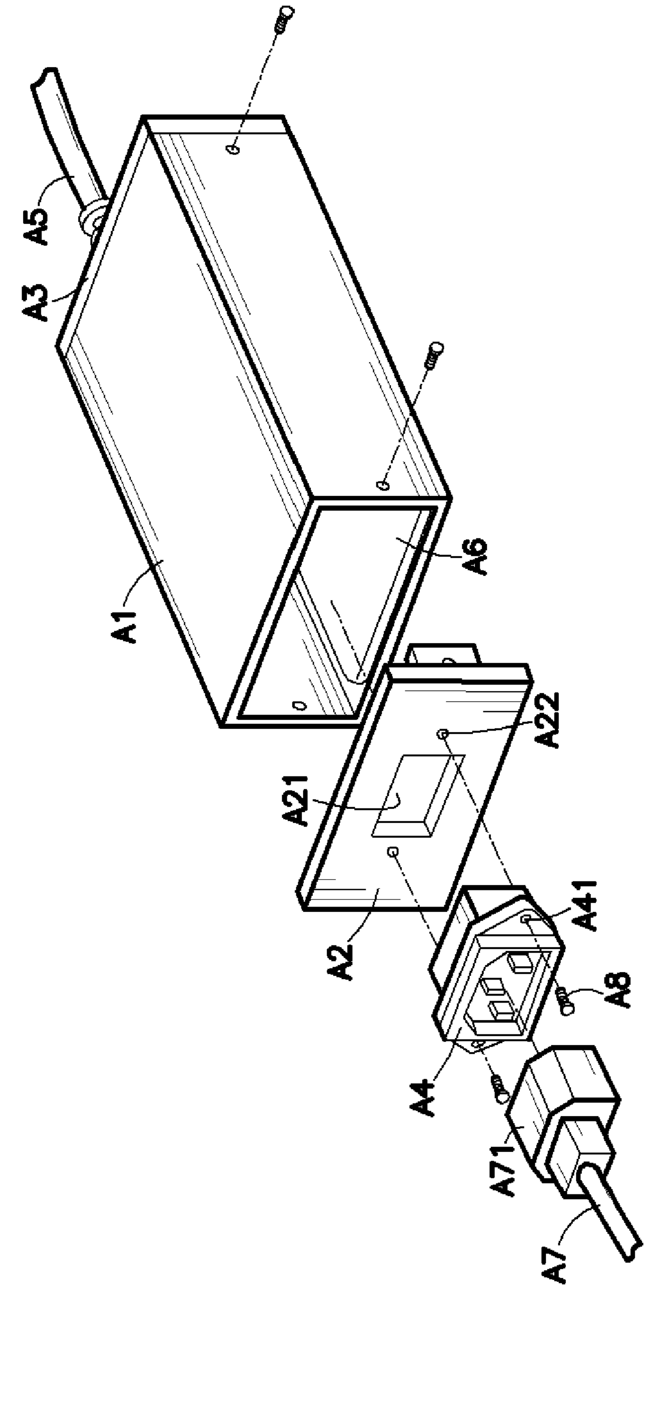
PRIOR ART FIG.6
FIG. 6 is an exploded view of the prior art design.

Referring to FIGS. 3 through 5 and FIG. 2 again, the plug body 21 of the anti-escape plug 2 is inserted through the insertion hole 121 of the face panel 12 of the anti-escape socket 1 into the socket body 111 at the base panel 11 to force the hook 22 into engagement with the retaining block 112. By means of the sloping guide face 113, the hook 22 is accurately guided into engagement with the retaining block 112. After the hook 22 hooked on the retaining block 112, the anti-escape plug 2 is prohibited from escaping out of the anti-escape socket 1. Thereafter, the tie screws 23 are rotated inwards and threaded into the respective screw holes 122 to lock the anti-escape plug 2 and the anti-escape socket 1.

Further, the base panel 11 and the face panel 12 can be fastened together by a plug joint. For example, pinholes are provided at the base panel 11 in the four corners, and locating pins are provided at the back side of the face panel 12 and respectively press-fitted into the respective pinholes at the base panel 11. Alternatively, the base panel 11 and the face panel 12 can be made in integrity.

As indicated above, the invention provides an anti-escape socket and plug arrangement, which has the following features.

1. The plug body 21 of the anti-escape plug 2 is positioned in the insertion hole 121 of the face panel 12 of the anti-escape socket 1 and electrically connected to the socket body 111 at the base panel 11 of the anti-escape socket 1, and the hook 21 of the anti-escape plug 2 is hooked on the retaining block 112 of the anti-escape socket 1 to prevent disconnection of the anti-escape plug 2 from the anti-escape socket 1 when the anti-escape plug 2 is touched by an external object or forced against an external object accidentally.

2. The anti-escape plug 2 has tie screws 23 respectively threaded into the respective screw holes 122 at the face panel 12 of the anti-escape socket 1 to enhance the connection between the anti-escape socket 1 and the anti-escape plug 2.

A prototype of anti-escape socket and plug arrangement has been constructed with the features of FIGS. 1~5. The anti-escape socket and plug arrangement functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An anti-escape socket and plug arrangement comprising:

an anti-escape socket, said anti-escape socket comprising a face panel, said face panel having an insertion hole and a plurality of locating holes spaced around said insertion hole, a base panel disposed adjacent to said face panel, a socket body fixedly provided at said base panel and aimed at said insertion hole of said face panel, and a retaining block fixedly provided at a top side of said socket body; and an anti-escape plug electrically connectable to said anti-escape socket, said anti-escape plug comprising a plug body insertable through said insertion hole of said face panel into said socket body, a hook fixedly provided at a top side of said plug body for hooking on said retaining block of said anti-escape socket to lock said anti-escape plug to said anti-escape socket upon insertion of said plug body into said socket body, and a plurality of fastening members for fastening to said locating holes of said face panel after insertion of said plug body into said socket body.

2. The anti-escape socket and plug arrangement as claimed in claim 1, wherein said retaining block has a sloping guide face adapted to guide said hook into engagement with said retaining block.

3. The anti-escape socket and plug arrangement as claimed in claim 1, wherein said locating holes of said face panel are screw holes, and said fastening members of said anti-escape plug are tie screws.

4. The anti-escape socket and plug arrangement as claimed in claim 1, wherein said face panel and said base panel are formed in integrity.

* * * * *